Sept. 27, 1932.  W. C. SPROUL  1,879,574
METAL WORKING TOOL
Original Filed May 3, 1930
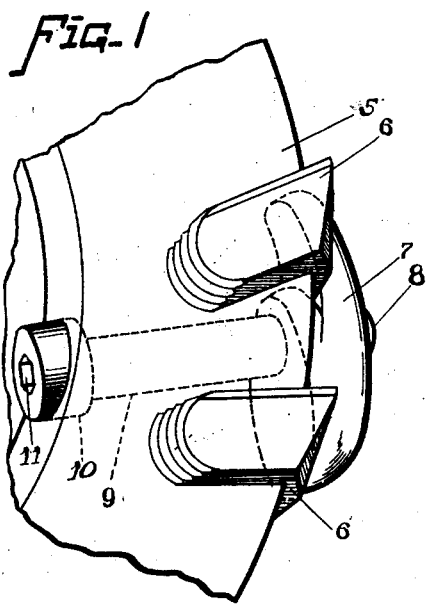
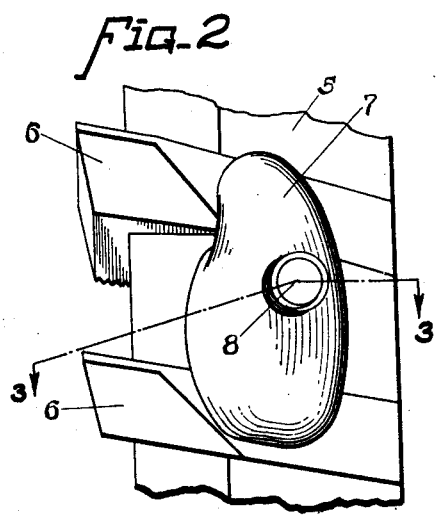
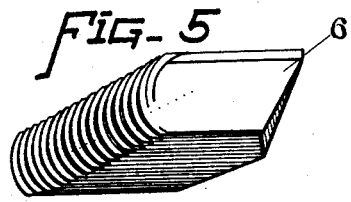
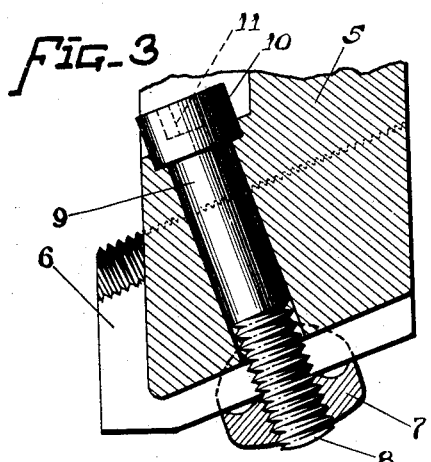
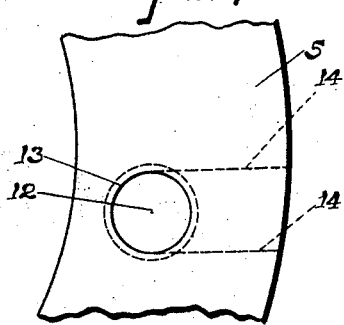
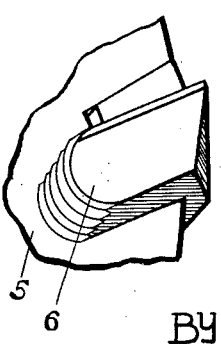
Inventor
W.C. SPROUL
BY
Attorney Patented Sept. 27, 1932

1,879,574

UNITED STATES PATENT OFFICE

WILLIAM C. SPROUL, OF ROCKFORD, ILLINOIS, ASSIGNOR TO THE INGERSOLL MILLING MACHINE COMPANY, OF ROCKFORD, ILLINOIS, A CORPORATION OF ILLINOIS

METAL WORKING TOOL

Original application filed May 3, 1930, Serial No. 449,425. Divided and this application filed January 2, 1931. Serial No. 506,132.

This application is a division of application serial number 449,425 filed May 3rd, 1930.

The present invention relates in general to metal working tools and has particular reference to that type of tool in which one or more inserted cutter teeth are rigidly and detachably secured in a rotary head, bar or the like mounting.

The application of the invention in the present instance is shown in connection with a milling cutter of the "face mill" type. Frequently these cutters are referred to in trade as "cone head" cutters due to the frustum shape of the head.

One difficulty in seeking a practical solution of the problems involved in the production of these types of cutters is concerned primarily in holding the teeth rigidly in an open-ended slot and at the same time allowing for adjustment of the teeth in a direction parallel with the axis of the head. Many solutions have been suggested such as interlocking the teeth in the head slots by the use of serrations, sometimes formed in the walls of the head slots and in the teeth themselves. In other instances, the use of shoes, keys and the like accessories have been employed. The use of such accessories is not to be tolerated if it is at all possible to get along without them because they add to the cost of production and are theoretically wrong. One of the important objects of the present invention is to provide means such as serrations or the like for interlocking the teeth in the slots of the head and to place these serrations in the base of the slot where they are most needed, without the aid of such accessories as shoes, keys or the like.

Briefly, the salient feature of the invention resides in providing serrations in the base of a tooth slot in a milling cutter or the like head with the serrations extending at an angle to the longitudinal axis of the slot and to equip the cutter tooth with serrations on its underside to interlock with the serrations thus provided for in the base of the slot.

It is not uncommon to cut serrations in the base of a slot in a milling cutter head when the serrations extend longitudinally or parallel with the axis of the head but to produce these serrations crosswise at an angle to the longitudinal axis of the slot is entirely a different matter. It is only after exercising considerable inventive ingenuity that it has been possible to devise a method of producing the serrations in the base of the slot at an angle to the longitudinal axis of the slot.

While the foregoing statement is indicative in a general way of the nature of the invention other objects and advantages will be apparent upon a full understanding of the construction and co-operative relationship of the several parts of the tool.

One form of the invention is presented herein by way of exemplification but it will of course be understood that the invention is susceptible of embodiment in still other structural modified forms without departing from the spirit of the invention as defined in the sub-joined claims.

In the accompanying drawing:

Fig. 1 is a view in perspective of a portion of a milling cutter, showing one application of the present invention;

Fig. 2 is a top plan view of a portion of a milling cutter, showing the application of the invention;

Fig. 3 is a view in cross section, taken on the line 3—3, Fig. 2;

Fig. 4 is a detailed view in side elevation of a portion of a milling cutter head, illustrating the method of reducing the present invention to practise;

Fig. 5 is a detailed perspective view of a cutter tooth made in accordance with the invention; and Fig. 6 is a detail perspective view of the invention as used in connection with a wedge type of holding means.

Since the invention is especially adapted for use in connection with inserted tooth milling cutters this particular use has been selected in the accompanying drawings and in which part 5 represents a portion of a milling cutter head the same having a plurality of circumferencially spaced slots for the reception of the inserted cutter teeth 6. These teeth are rigidly and detachably fastened in the slots by clamping heads 7 which are made to straddle each of a pair of teeth. Each of the clamping heads 7 is made with a tapped hole into which is threaded the end 8 of a bolt 9. The bolt is inserted through a hole which is drilled through the head 5 from the outer to the inner circumference. The hole is also countersunk to accommodate the head 10 of the bolt which in turn is made with a key socket 11 so that the bolt may be turned to release or tighten the clamping heads 7.

In addition to the clamping device for rigidly and detachably holding the teeth in the slots additional means is employed to co-operate therewith. In this connection attention is now invited to the serrations on the bottom of the teeth and in the base of the head slots. These serrations according to the present invention are preferably made on the order of threads. The reason for which will be hereinafter explained.

It has not been uncommon to cut serrations in the base of the head slots and match them with serrations on the underside of the cutter teeth but these serrations have always extended longitudinally of the slots or in other words in a direction parallel or substantially parallel with the axis of the head. In cases where the serrations were provided crosswise or substantially crosswise to the axis of the head it has been necessary to use shoes, keys or the like. The present invention provides serrations in the base of the head slot which extend at an angle to the longitudinal axis of the slot without the use of shoes, keys or the like. In reducing the invention to practice a series of holes 12 are drilled through the thickness of the head 5 at spaced intervals around the same. The holes being then tapped, as shown in dotted lines in Fig. 4, then the metal between the dotted lines 14 is cut away to leave the slots, the result being a slot with half-threads or thread like serrations in the base thereof. The cutter teeth 6 are serrated across the bottom to leave half-threads corresponding to the thread like serrations in the base of the slots. The thread like serrations on the bottom of the teeth merge into the sides of the teeth and correspond to the thread like serration in the bottom of the slots and in this connection it should be pointed out that the width of the slots should be less than the diameter of the root of the threads tapped as at 13 to properly accommodate the teeth without lost motion.

A cutter assembly constructed in accordance with the present invention provides an unusually convenient means of adjusting the teeth parallel or substantially parallel with the axis of the head and also avoids any possibility of the teeth moving in the slots in a direction parallel or substantially parallel with the axis of the head.

In Fig. 6 the serrations are shown in connection with a wedge type of holding means.

In this divisional application the serrated structure of the assembly is covered, whereas in the parent application of which this is a division the method of producing the serrations is claimed.

Having thus described and shown an embodiment of this invention, what I claim and desire to secure by Letters Patent of the United States is:

1. In an inserted tooth metal working tool the combination of a slotted head having helical half-threads formed in the base of the slot thereof and a cutter tooth for said slot having mating helical half-threads on its underside to interlock with the helical half-threads in the base of the head slot, and means for rigidly and detachably holding the tooth in the slot.

2. The combination as set forth in claim 1 and in which the width of the head slot is less than the diameter of the root of the threads in the base of said slot.

3. In an inserted tooth metal working tool the combination of a slotted head having helical half-threads formed in the base of the slot thereof and a cutter tooth for said slot having mating helical half-threads on its underside to interlock with the helical half-threads in the base of the head slot, and means for rigidly and detachably holding the tooth in the slot, comprising clamping means engaging the top side of the tooth.

Signed at Rockford, in the county of Winnebago, and State of Illinois, this 31st day of December, 1930.

WILLIAM C. SPROUL.